United States Patent [19]
Mutalik et al.

[11] Patent Number: 6,161,111
[45] Date of Patent: Dec. 12, 2000

[54] SYSTEM AND METHOD FOR PERFORMING FILE-HANDLING OPERATIONS IN A DIGITAL DATA PROCESSING SYSTEM USING AN OPERATING SYSTEM-INDEPENDENT FILE MAP

[75] Inventors: Madhav Mutalik, Northboro; Faith M. Senie, Bolton, both of Mass.

[73] Assignee: EMC Corporation, Hopkinton, Mass.

[21] Appl. No.: 09/052,356

[22] Filed: Mar. 31, 1998

[51] Int. Cl.⁷ ..................................................... G06F 17/30
[52] U.S. Cl. ........................... 707/205; 707/10; 711/118; 705/42
[58] Field of Search ................................. 707/205, 10, 8; 705/42; 364/242, 400; 711/118; 713/165; 700/94

[56] References Cited

U.S. PATENT DOCUMENTS

| | | | |
|---|---|---|---|
| 5,321,816 | 6/1994 | Rogan et al. | 705/42 |
| 5,454,099 | 9/1995 | Myers et al. | 714/6 |
| 5,881,311 | 3/1999 | Wood | 710/4 |
| 5,893,140 | 4/1999 | Vahalia et al. | 711/118 |
| 5,948,062 | 9/1999 | Tzelnic et al. | 707/10 |
| 5,950,203 | 9/1999 | Stakuis et al. | 707/10 |

*Primary Examiner*—Wayne Amsbury
*Assistant Examiner*—Thu-Thao Havan
*Attorney, Agent, or Firm*—Richard A. Jordon; John M. Gunther

[57] ABSTRACT

A file management system is disclosed for managing files stored on a mass storage subsystem in response to file management commands. The mass storage subsystem stores data on at least one storage device, said storage device including a series of blocks. The file management system comprises an operating system-independent file map, a file management command receiver module, and a file management command execution module. The operating system-independent file map stores information identifying, for each file, block information identifying blocks on which the file is stored. The file management command receiver module receives a file management command. The file management command execution module executes the file management command in relation to the operating system-independent file map.

20 Claims, 16 Drawing Sheets

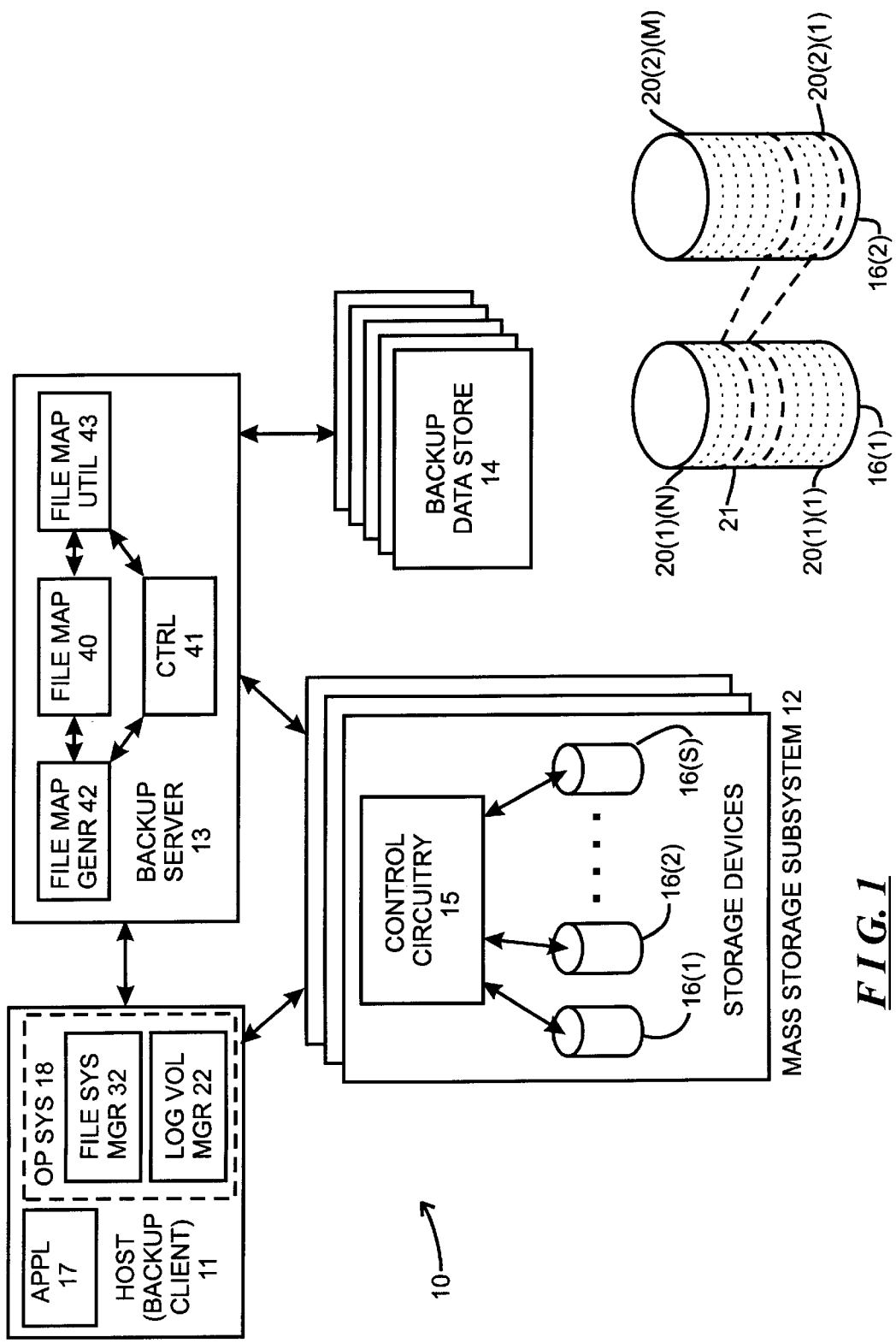

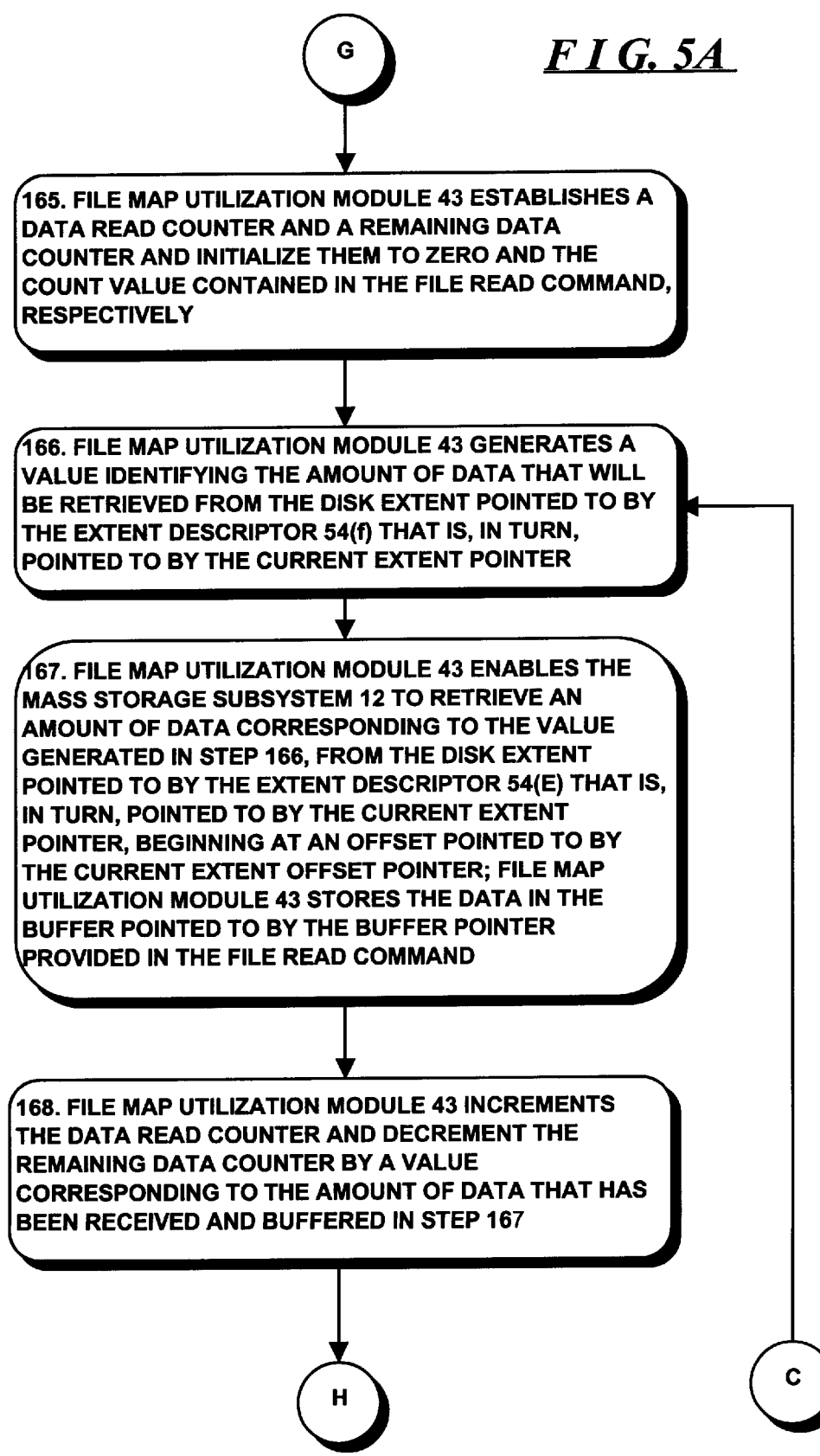

SYSTEM AND METHOD FOR PERFORMING FILE-HANDLING OPERATIONS IN A DIGITAL DATA PROCESSING SYSTEM USING AN OPERATING SYSTEM-INDEPENDENT FILE MAP

U.S. patent application Ser. No. 09/052,579, filed on even date herewith in the names of Madhav Mutalik, et al., and entitled "System And Method For Backing Up Data Stored In Mass Storage Subsystem Under Control Of A Backup Server", assigned to the assignee of this application and incorporated herein by reference.

U.S. patent application Ser. No. 09/052,318, filed on even date herewith in the names of Madhav Mutalik, et al., and entitled "System And Method For Backing Up Data Stored In Multiple Mirrors On A Mass Storage Subsystem Under Control Of A Backup Server", assigned to the assignee of this application and incorporated herein by reference.

U.S. patent application Ser. No. 09/052,209, filed on even date herewith in the names of Madhav Mutalik, et al., and entitled "System And Method For Generating An Operating System-Independent File Map", assigned to the assignee of this application and incorporated herein by reference.

FIELD OF THE INVENTION

The invention relates generally to the field of digital data processing systems and more particularly to mass digital data storage subsystems. The invention provides a system and method for performing backup of data stored in a mass storage subsystem.

BACKGROUND OF THE INVENTION

Digital computer systems are used in a number of applications in which virtually continuous availability of data is important to the operation of businesses or other entities using the systems. Generally, computer centers will periodically produce back-up copies of data on their various digital computer systems. Such back-up copies are usually not maintained on a continuous basis, but instead at particular points in time, often at night when the normal processing load on the computer centers is reduced and modifications to the data being backed up may be minimized, and in any case represent the data at the particular points in time at which the back-up copies are generated. Accordingly, if a failure occurs between back-ups, data which has been received and processed by the digital computer systems since the last back-up copy was produced, may be lost. Typically, such back-up copies will be maintained by the computer centers at their respective sites so that they may be used in the event of a failure, although some off-site archival back-ups may be maintained. Significant additional problems arise in the case of, for example, catastrophic events that can occur, such as may result from, for example, fire, flood or other natural disasters, intentional tampering or sabotage and the like, which may result in unintentional or intentional damage to an entire site or some significant portion thereof, since some or all of the back-up copies may also be damaged and the data contained thereon may be unavailable.

Several backup strategies have been developed. In one strategy, software which maintains and controls the data to be backed up, such as database software, initiates and performs the backup operation. In such an arrangement data, generally in the form of incremental changes to a database, is provided by the database software to a backup management software, which stores the data on a backup device. One advantage of this strategy is that, since only incremental changes are backed up, less data needs to be backed up at any point in time. A disadvantage is, however, that although less data is copied with this strategy, a load is still exerted on the production system processing the database software.

In a second strategy, backups are performed outside the database software. In this strategy, data files are backed up independently of the database software. While this minimizes the load on the production system processing the database software and can result in relatively high-speed backups of full data files, the backup and restore operations do not make use of the facilities that are currently provided in commercial database software.

U.S. patent application Ser. No. 09/052,579 filed on even date herewith in the names of Madhav Mutalik, et al., and entitled "System And Method For Backing Up Data Stored In Mass Storage Subsystem Under Control Of A Backup Server" and U.S. patent application Ser. No. 09/052,318, filed on even date herewith in the names of Madhav Mutalik, et al., and entitled "System And Method For Backing Up Data Stored In Multiple Mirrors On A Mass Storage Subsystem Under Control Of A Backup Server" (both of which are generally identified herein as the Mutalik, et al., applications) describe arrangements for backing up data stored on a mass storage subsystem using a backup server. In response to requests from an application executed by, for example, a host computer, the backup server performs the backup operation, relieving the host computer of that responsibility and allowing the host computer to perform other operations concurrently with the backup operation, thereby enhancing the throughput of the host computer. In one embodiment, the backup server is in the form of a suitably programmed computer, the computer comprising, for example, a workstation or personal computer. A problem arises in connection with such an arrangement, since the file system and file formats and structures provided by the host computer's operating system to manage data files for the host computer and its applications, may differ from those that the operating system used by the backup server's computer.

SUMMARY OF THE INVENTION

The invention provides anew and improved system and method for **backing up data stored on a mass storage subsystem under control of a backup server.

In brief summary, a file management system manages files stored on a mass storage subsystem in response to file management commands. The mass storage subsystem stores data on at least one storage device, said storage device including a series of blocks. The file management system comprises an operating system-independent file map, a file management command receiver module, and a file management command execution module. The operating system-independent file map stores information identifying, for each file, block information identifying blocks on which the file is stored. The file management command receiver module receives a file management command. The file management command execution module executes the file management command in relation to the operating system-independent file map.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1 is a functional block diagram of a digital data processing system including an arrangement for backing up data, constructed in accordance with the invention;

FIGS. 1A through 1C are detailed diagrams useful in understanding the operation of the digital data processing system depicted in FIG. 1.

DETAILED DESCRIPTION OF AN ILLUSTRATIVE EMBODIMENT

Figure 1B:
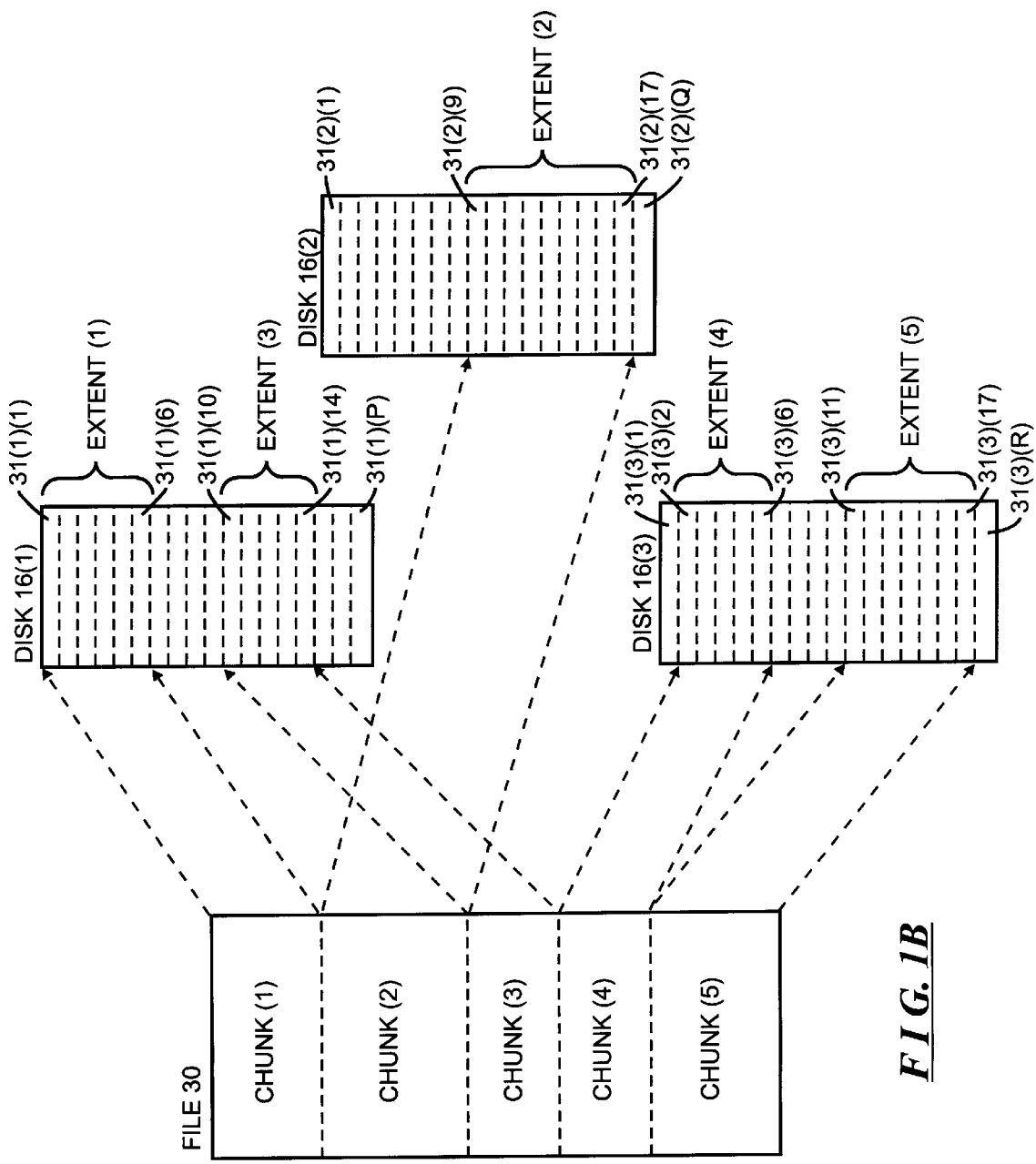

FIG. 1 is a functional block diagram of a digital data processing system 10 including an arrangement for backing up data, constructed in accordance with the invention. With reference to FIG. 1, digital data processing system 10 includes host computer 11, one or more mass storage subsystems generally identified by reference numeral 12, a backup server 13, and one or more backup data stores generally identified by reference numeral 14. The host computer 11, which, as will be described below, also operates as a backup client, executes one or more applications, generally identified by reference numeral 17, which make use of the data stored in the mass storage subsystems 12, execution occurring under control of an operating system 18. In one particular illustrative embodiment, one application executed by the host computer 11 comprises the well-known Oracle 7 database management system (DBMS) program available from Oracle Corporation, although it will be appreciated that the digital computer system may also or instead process DBMS programs from other manufacturers, as well as other programs which are not DBMS programs. In the embodiment described herein, it will be assumed that the system 10 includes one mass storage subsystem 12 although it will be appreciated that embodiments of the invention may include multiple mass storage subsystems of varying configurations and architectures.

The mass storage subsystem 12 used in digital data processing system 10 includes a mass- or secondary-storage subsystem which stores data in disk-based storage. In one embodiment, the mass storage subsystem 12 comprise the mass storage subsystem similar to that described in, for example, U.S. Pat. No. 5,206,939, entitled "System And Method For Disk Mapping And Data Retrieval," issued Apr. 27, 1993 to Moshe Yanai, et al, U.S. patent application. Ser. No. 07/893,509 filed Jun. 4, 1995, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al., all of which are assigned to the assignee of the present invention and incorporated herein by reference, although it will be appreciated that any mass storage subsystem may be used with the present invention. In that embodiment, the mass storage subsystem 12 includes one or more disk storage units which store data in magnetic form, and further utilizes large caches to cache data retrieved from the disk storage units to be transferred to the host 11 for processing and updated data provided by the host 11 to be transferred to the disk storage units for storage, all under control of circuitry generally identified as control circuitry 15. In that embodiment, the mass storage subsystem 12 stores data in multiple disk storage devices 16(1) through 16(S) (generally identified by reference numeral 16(s)).

The backup server 13 and backup data stores 14 operate to back up the data stored on the mass storage subsystem 12, thereby reducing the likelihood of data loss in the event of a malfunction or other failure of one or more disk drive units or other components of the mass storage subsystem 12. The operations performed by the backup server 13 and backup data stores 14 in performing backup operations in respective embodiments of system 10 are described in detail in the aforementioned Mutalik, et al, applications and will not be described herein in detail. Generally, the backup server 13 initiates backup operations in response to requests therefor from the host computer 11, so that the host computer 11 is effectively a backup client of the backup server 13. In one embodiment, the backup server 13 includes a suitably-programmed digital computer, such as a workstation or personal computer. After receiving a request from the host computer 11, the backup server 13 will initiate a backup operation in connection with data stored on the mass storage subsystem 12. During a backup operation, the backup server 13 will retrieve data that is to be backed up from the mass storage subsystem 12 and transfer it to the backup data store 14 for backup storage. In one embodiment, the backup data store 14 stores data provided thereto by the backup server 13 on magnetic tape cartridges (not separately shown), and the backup data store 14 will include one or more drives and associated circuitry (also not separately shown) for storing the data on the cartridges. The backup data store 14 may also include an autochanger arrangement for loading respective cartridges onto the drives, and for removing respective cartridges from the drives after they are full.

In addition to performing backup operations, the backup server 13 and backup data store 14 can also perform a restore operation, in which data which has been backed up onto the backup data store 14, is restored to the mass storage subsystem 12. This may occur, for example, following correction of a malfunction in the mass storage subsystem 12 or the host computer 11 in which data may have become lost or corrupted. The operations performed by the backup server 13 and backup data stores 14 in performing restore operations in respective embodiments of system 10 are described in detail in the aforementioned Mutalik, et al, applications and will also not be described herein in detail. In a restore operation, the backup server 13, after receiving a request therefor from the host computer 11, will enable the backup data store 14 to retrieve the data that is to be restored from the respective tape cartridge or cartridges on which it was previously stored, and transfer it (that is, the retrieved data) to the mass storage subsystem for storage. The mass storage subsystem's control circuitry 15 will distribute the data to the respective disk storage devices 16(s) in a conventional manner.

As described in the Mutalik, et al., applications, during both a backup operation and a restore operation, the respective operation proceeds in four phases, namely, a discovery phase, a preparation phase, an execution phase. As noted above, the backup server 13 performs a backup operation in response to a request therefor from the host computer 11 operating as backup client. In the discovery phase during both a backup operation and a restore operation, the backup server 13 receives from the host computer 11 filenames identifying particular files which are stored on the mass storage subsystem 12 that are to be backed up, and in addition identifies the particular disk storage devices 16(s) which contain the files that are to be backed up, along with the locations on the respective disk storage devices which contain them.

Since the file system and file formats and structures provided by the host computer's operating system to manage data files for the host computer and its applications, may differ from those used by the operating system controlling the backup server 13, the backup server generates operating system-independent information for the files stored on the mass storage subsystem 12 that are to be backed up or restored, which it uses during the backup or restore operation. In particular, the backup server 13 generates and makes use of a file map, identified in FIG. 1 by reference numeral 40, which includes the operating system-independent file information for use during the backup or restore operation. The file map 40 is generated by a file map generator 40 under control of a control module 41, following initiation of a backup or restore operation by the host computer 11. After the control module 41 receives file names for files to be backed up or restored, the file map generator 42 generates the operating system-independent file information for storage in the file map for use during the respective backup or restore operation.

After the file map generator 42 has generated the information for the file map 40, the control module 41 and the file map utilization module 43 can proceed with subsequent operations during the backup and restore operation, including in one embodiment the preparation, execution and cleanup phases using the information in the file map 40 to provide information for the files to be backed up or restored. In one embodiment, the file map utilization module 43 processes file commands, such as file open, file close, read and write commands, which are issued thereto by the control module during a respective backup or restore operation, using the operating system-independent information in the file map 40.

Operations performed by the file map generator 42 in generating the file map 40 and the file map utilization module 43 in utilizing the file map 40 will be described below in connection with FIGS. 2 and 3–7, respectively. Preliminarily, however, it would be helpful to describe the organization of data comprising a file stored on the disk storage devices 16(s) comprising the mass storage subsystem 12, which will be helpful in understanding the operating system-independent information which is stored in the file map for a file. Generally, the disk storage devices 16(s) in the mass storage subsystem 12 are organized into one or more "logical volumes" each of which may comprise at least portions of one or of the disk storage devices 16(s). This will be described in connection with FIG. 1A. FIG. 1A depicts illustrative details for two disk storage devices, identified by reference numerals 16(1) and 16(2). Each disk storage device 16(1) and 16(2) stores data in a plurality of blocks, with disk storage device 16(1) storing data in blocks 20(1)(1) through 20(1)(N) (generally identified by reference numeral 20(1)(n)), and disk storage device 16(2) storing data in blocks 20(2)(1) through 20(2)(M) (generally identified by reference numeral 20(2)(m)). The disk storage devices 16(s) may comprise the same number of blocks (in which case "M" equals "N"), or differing numbers of blocks (in which case "M" may differ from "N"). Each block 20(1)(n) and 20(2)(m), which is identified by a block identifier, can generally accommodate a predetermined maximum amount of data. Blocks, in turn are aggregated into logical volumes, one of which, identified by reference numeral 21, is illustrated in FIG. 1A. The logical volume 21 depicted in FIG. 1A comprises several blocks 20(1)(n) from disk storage device 16(1) and several blocks 20(2)(n) from disk storage device 16(2). Logical volumes are established and managed by a logical volume manager portion 22 (FIG. 1) of the operating system controlling host computer 11.

A file, in turn, is stored in a logical volume. Files are established and managed by a file system manager portion 32 (FIG. 1) of the operating system controlling host computer 11. A file may include several portions which are distributed among one or more disks and one or more series of blocks, which are referred to herein as disk "extents" on each disk. This will be described in connection with FIG. 1B. FIG. 1B depicts illustrative details for a file 30 portions of which are stored on three disk storage devices 16(1), 16(2) and 16(3). Each disk storage device 16(s) comprises a series of blocks, with disk storage device 16(1) comprising a series of blocks 31(1)(1) through 31(1)(P) (generally identified by reference numeral 31(1)(p), disk storage device 16(2) comprising a series of blocks 31(2)(1) through 31(2)(Q) (generally identified by reference numeral 31(2)(q) and disk storage device comprising a series of blocks 31(3)(1) through 31(3)(R) (generally identified by reference numeral 31(3)(r)). The storage devices 16(s) may have the same number of blocks (in which case "P," "Q," and "R" may be equal) or they may have different numbers of blocks (in which case "P," "Q" and "R" may, but need not be different). For the illustrative file 30:

(i) a first portion, identified in FIG. 1B as "Chunk (1)," is stored in a series of blocks on disk storage device 16(1) starting at block 31(1)(0) and extending through block 31(1)(6), which comprise an extent identified as "Extent (1)";

(ii) a second portion, identified as "Chunk (2)," is stored in a series of blocks on disk storage device 16(2) starting at block 31(2)(9) and extending through block 31(2)(17), which comprise an extent identified as "Extent (2)";

(iii) a third portion, identified as "Chunk (3)," is stored in a series of blocks on disk storage device 16(1) starting at block 31(1)(10) and extending through block 31(1)(14), which comprise an extent identified as "Extent (3)";

(iv) a fourth portion, identified as "Chunk (4)," is stored in a series of blocks on disk storage device 16(3) starting at block 31(3)(2) and extending through block 30(3)(6), which comprise an extent identified as "Extent (4)"; and (v) a fifth and final portion, identified "Chunk (5)," is stored in a series of blocks on disk storage device 16(3) starting at block 31(3)(11) and extending through block 31(3)(17), which comprise an extent identified as "Extent (5)."

Since a file such as file 30 will preferably be stored in a single logical volume, all of the extents Extent (1) through Extent (5) on the disk storage devices 16(1) through 16(3) will preferably comprise at least a portion of a single logical volume.

Each extent comprising file 30 is identified by an identifier or "extent descriptor," identifying the disk storage device 16(s) on which it is stored, the first block in the series of blocks comprising the extent and the number of successive blocks comprising the extent. Accordingly, Extent (1) is identified by, for example, an extent descriptor of the form <DISK16(1)_BLOCK31(1)(1)_6>, where "DISK16(1)" identifies the disk storage device, namely, disk storage device 16(1) on which the extent is stored, "BLOCK30(1)(1)" identifies the first block, namely, block 31(1)(1) in the extent, and "6" identifies the number of successive blocks 31(1)(p) comprising the extent. Similarly, (i) Extent (2) is identified by a descriptor of the form <DISK16(2)_BLOCK31(2)(9)_9>;

(ii) Extent (3) is identified by a descriptor of the form <DISK16(1)_BLOCK31(1)(10)_5>;

(iii) Extent (4) is identified by a descriptor of the form <DISK16(3)__BLOCK31(3)(2)__5>; and (iv) Extent (5) is identified by a descriptor of the form <DISK16(3)__BLOCK31(3)(11)__7>.

The list of extents on the respective disk storage device(s) 16(s) on which the data in file 30 is stored essentially defines the file in a manner that is independent of the particular operating system that is controlling the host computer 11 or the operating system controlling backup server 13.

Figure 1C:
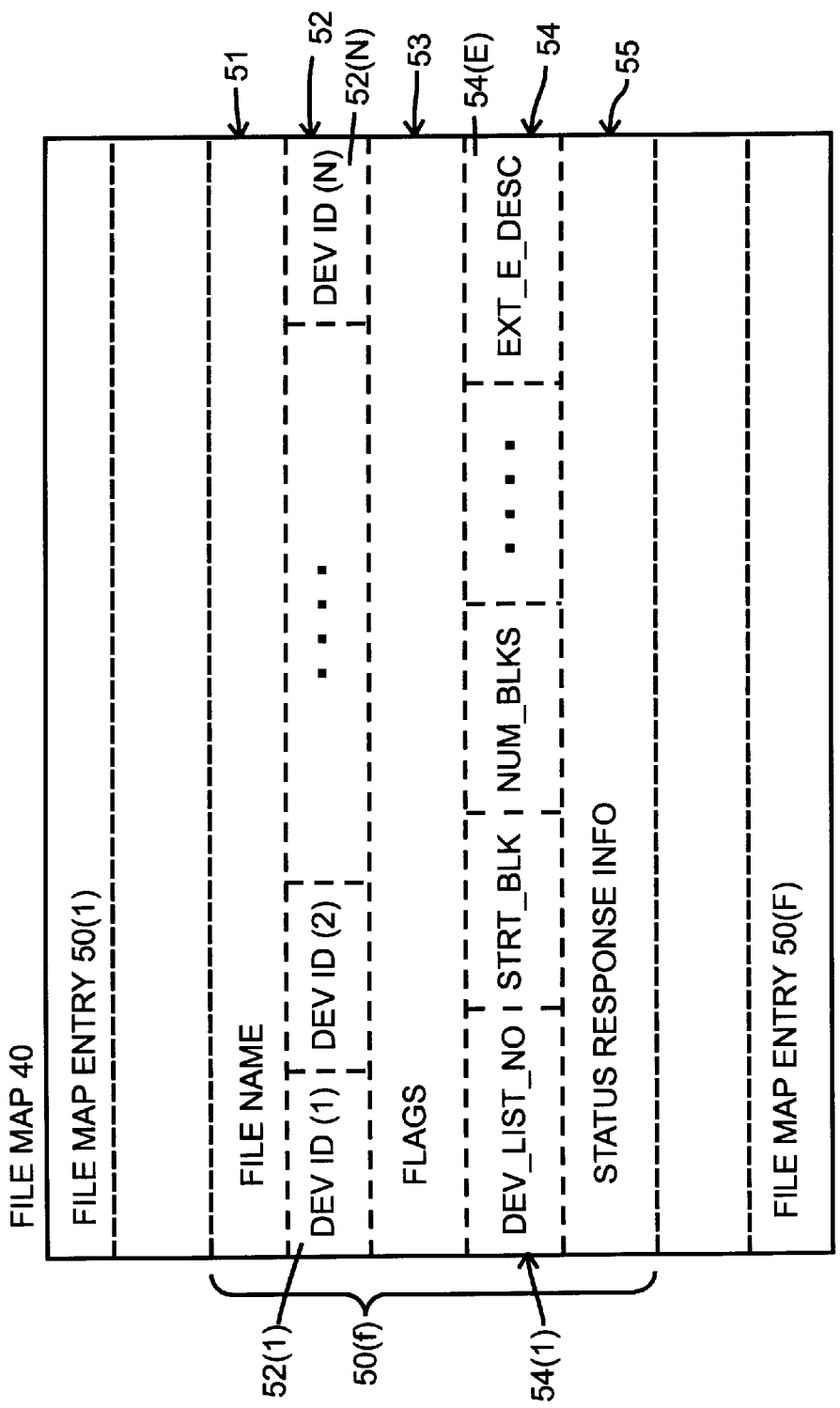

With this background, the file map 40 that is generated by the file map generator 42 for a backup or restore operation will be described in connection with FIG. I C. With reference to FIG. 1C, the file map 40 includes one or more file map entries 50(1) through 50(F) (generally identified by reference numeral 50(f), each of which is associated with one of the files to be backed up or restored during the backup or restore operation. Each entry 50(f) includes a number of fields, including a file name field 51, a disk storage device list 52, a flags field 53, an extent descriptor list 54 and a status response information list 55. The file name field 51 contains a file name that identifies the particular file with which the entry 50(f) is associated, which corresponds to the file name of one of the files to be backed up or restored during the backup or restore operation.

The disk storage device list 52 of file map entry 50(f) contains one or more disk storage device identifier entries 52(1) through 51(N) (generally identified by reference numeral 51(n)), each of which identifies one of the disk storage devices 16(s) which contains at least one extent on which a portion of the file identified in file name field 51 is stored. Each disk storage device 16(s) which contains such an extent is identified in only one disk storage device identifier entry 52(n) in the disk storage device list 52 of the entry 50(f). Thus, for the illustrative file 30 described above in connection with FIG. 1B, the disk storage device list 52 would have three disk storage device identifier entries 52(1) through 52(3), one for each of the disk storage devices 16(1), 16(2) and 16(3) on which extents associated with file 30 are stored.

The flags field 53 of entry 50(f) stores one or more flags which are useful in utilizing the entry 50(f); in one embodiment, the flags field 53 identifies, for example, the particular operating system for the host computer 11 which accesses the file identified in file name field 51.

The extent descriptor list 54 of the file map entry 50(f) comprises one or more extent descriptors 54(1) through 54(E) (generally identified by reference numeral 54(e)), each of which is associated with one of the extents on which the file is stored. If the extent descriptor list 54 contains a plurality of extent descriptors 54(e), the series of extent descriptors 54(1), 54(2), . . . 54(E) are in the order corresponding to the series of extents on which the file associated with file map entry 50(f) are stored. Each extent descriptor 54(e) comprises a plurality of fields, namely, a device list index field "DEV__LIST__IDX," a starting block identifier field "STRT__BLK" and a number of blocks field "NUM__BLKS." The device list index field stores an index into the disk storage device list 52 for the particular disk storage device identifier entry 52(n) whose contents identify the disk storage device 16(s) on which the extent associated with the descriptor is stored. The starting block identifier field identifies the starting block for the extent, and the number of blocks field identifies the number of blocks comprising the extent. Accordingly, for the illustrative file 30 described in connection with FIG. 1B, if the disk storage device identifier entry 52(1) of disk storage device list 52 identifies disk storage device 16(1), disk storage device identifier entry 52(2) identifies disk storage device 16(2) and disk storage device identifier entry 52(3) identifies disk storage device 16(3), then the extent descriptors 54(e) of extent descriptor list 54 is of the form:

<1__BLOCK31(1)(1)__6>;extent descriptor 54(1)

<2__BLOCK31(2)(9)__9>;extent descriptor 54(2)

<1__BLOCK31(1)(10)__5>;extent descriptor 54(3)

<3__BLOCK31(3)(2)__5>;extent descriptor 54(4), and

<3__BLOCK31(3)(11)__7>;extent descriptor 54(5), with the initial "1," "2" and "3" in each extent descriptor comprising the index into the disk storage device list 52 for the particular entry 52(n) which contains the identification of the disk storage device 16(s) on which the disk extent associated with the extent descriptor 14(e) is stored. By providing a separate disk storage device list 52 identifying all of the disk storage devices 16(s) which contain disk extents on which the file is stored, with one disk storage device entry 52(n) per each such disk storage device 16(s), and using in each extent descriptor 54(e) the index into the list 52 to identify the disk storage device 16(s) instead of the actual identifier for the disk storage device 16(s), the file map entry 50(f) may be somewhat shorter than if the identifier for the respective disk storage device 16(s) is actually used in the extent descriptor 54(e), particularly if the data in the file is spread across a number of disk extents on a relatively few disk storage devices 16(s).

Finally, the status response information entry 55 of file map entry 50(f) contains predetermined response information useful in particular by the file map utilization module 43 in preparing responses to status requests requesting status for the file associated with file map entry 50(f) which may be generated by, for example, the control module 41.

Figure 2:
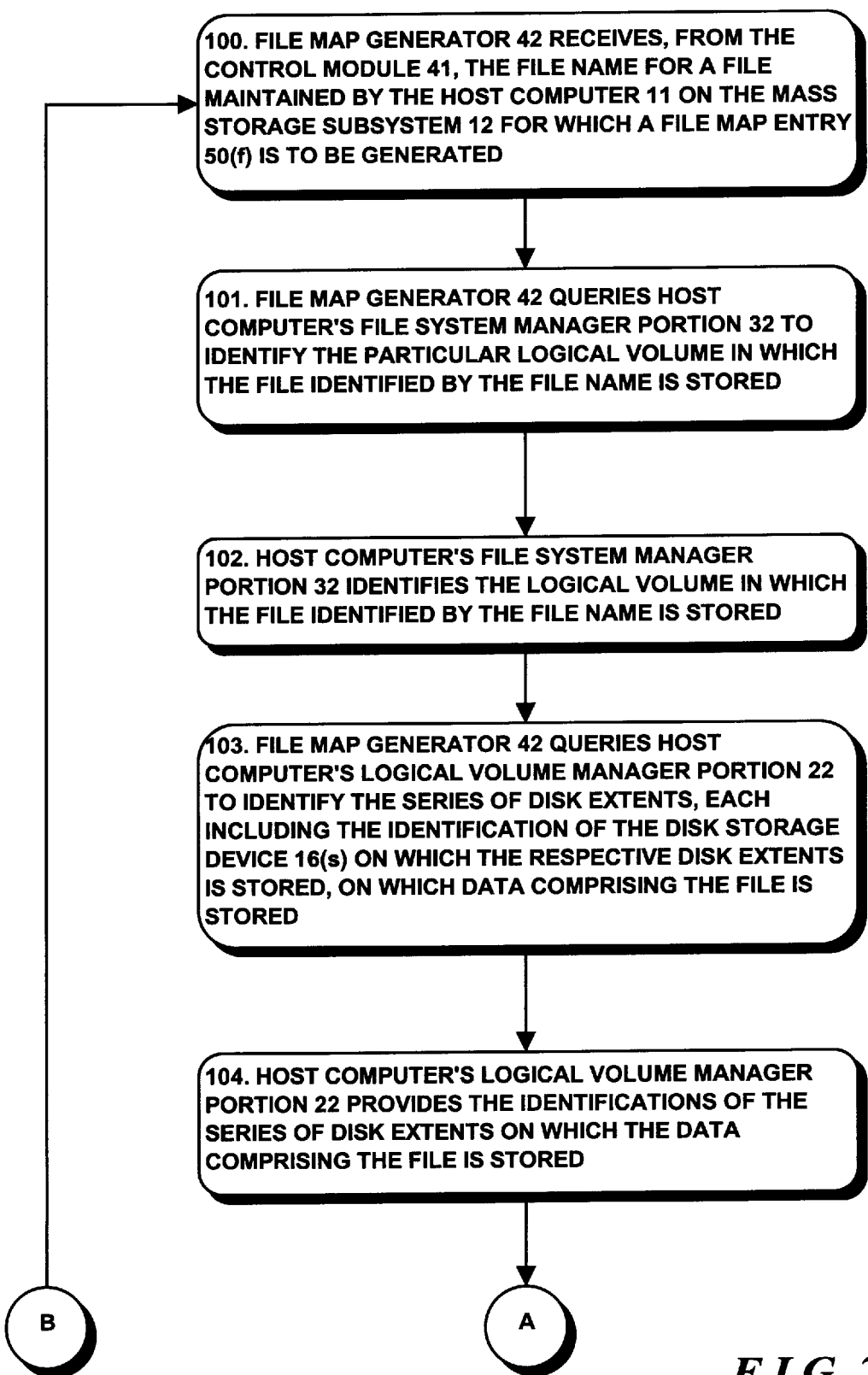
FIGS. 2 through 7 are flowcharts depicting operations performed by the digital data processing system during a backup and restoration operation, useful in understanding the invention.
Figure 2A:
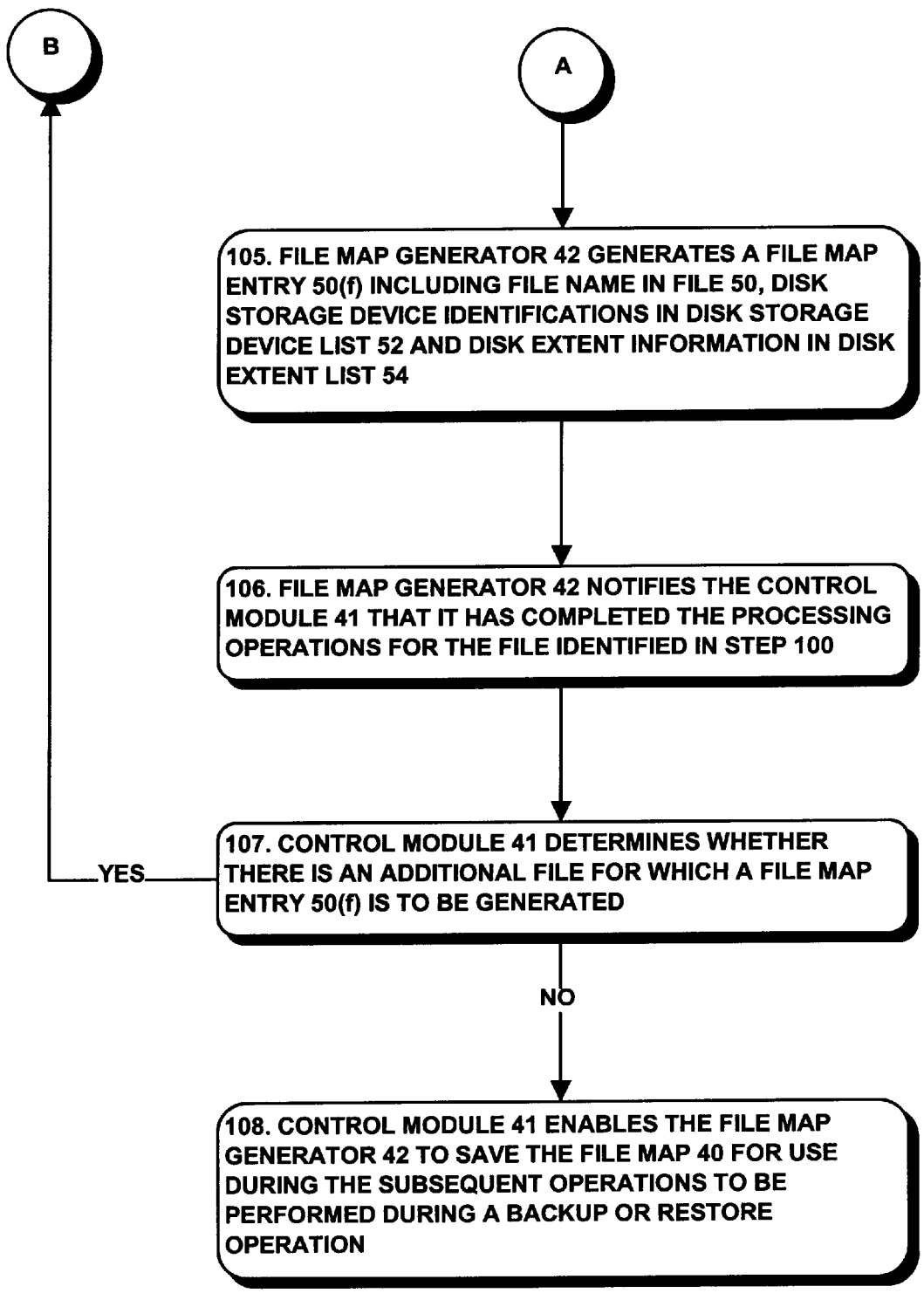
Figure 3:
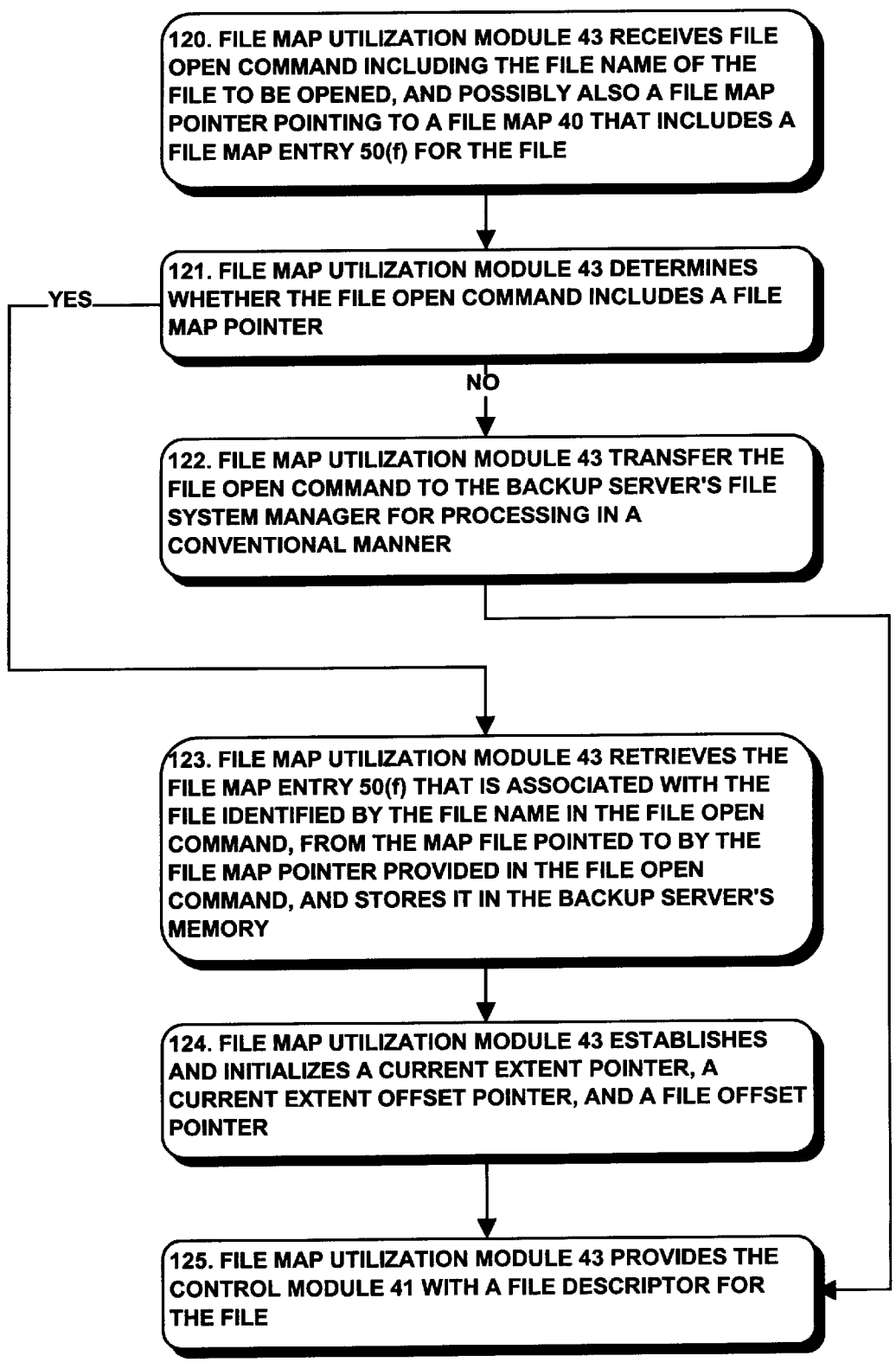

Operations performed by the file map generator 42 in generating the file map 40 will be described in connection with FIG. 2. Generally, the file map generator 42 generates the file map 40 in a series of iterations, in each iteration generating a file map entry 50(f) for one of the files to be backed up or restored. With reference to FIG. 2, the file map generator 42 initially receives, from the control module 41, the file name for a file maintained by the host computer 11 on the mass storage subsystem 12 for which a file map entry 50(f) is to be generated (step 100). Generally, as noted above, in system 10 the control module 41 will provide the file name to the file map generator 42 to enable the file map entry 50(f) to be generated as part of a backup or restore operation and in that connection the file is expected to be backed up or restored during subsequent operations in the backup or restore operation as described in the aforementioned Mutalik, et al., applications. After receiving the file name from the control module 41, the file map generator 42 queries the file system manager portion 32 maintained by the host computer 11 to identify the particular logical volume (reference logical volume 21, FIG. 1A) in which the file identified by the file name is stored (step 101). After the host computer's file system manager portion 32 identifies the logical volume in which the file identified by the file name is stored (step 102), the file map generator 42 queries the logical volume manager portion 22 maintained by the host computer 11 to identify the series of disk extents, each including the identification of the disk storage device 16(s) on which the respective disk extents is stored, on which data comprising the file is stored (step 103). After the host computer's logical volume manager portion 22 provides the identifications of the series of disk extents on which the data comprising the file is stored (step 104), the file map generator 42 generates the file map entry 50(f) associated therewith (step 105) and notifies the control module 41 that it has completed the processing operations for the file identified in step 100 (step 106). It will be appreciated that, since the file map entry 50(*f*) identifies the particular location or series of locations on the respective disk storage devices 16(*s*) in which data comprising the file identified in step 100 is stored, it comprises a representation for the locations of the particular file or portions thereof that is independent of the operating system that is controlling the host computer 11.

After the control module 41 has been notified in step 106 that the file map generator 42 has completed the processing operations for the file identified in step 100, it will determine whether there is an additional file for which a file map entry 50(*f*) is to be generated (step 107). If the control module makes a positive determination in step 107, that is, if it determines that there is an additional file for which a file map entry 50(*f*) is to be generated, it will return to step 100 to provide an additional file name to the file map generator 42 to enable the file map generator 42 to repeat steps 100 through 106 through another iteration to generate the file map entry 50(*f*) for the file identified by the additional file name. In some iteration, the control module 41 will make a negative determination in step 107, that is, it will determine in step 107 that there are no additional files for which a file map entry 50(*f*) is to be generated. At that point, there will be file map entries 50(*f*) for all of the files to be backed up or restored during the backup or restore operation, and the control module 41 will enable the file map generator 42 to save the file map 40 (step 108) for use during the subsequent operations performed during the backup or restore operation.

Operations performed by the control module and the file map utilization module 43 will be described in connection with FIGS. 3 through 6. Generally, during a backup operation in connection with a file, the control module 41 will initiate a number of operations in connection with the file, including (i) a "file open" operation to "open" the file;
  (ii) one or more "file read" operations, in which the mass storage subsystem 12 is enabled to retrieve data from the file as stored on the storage device(s) 16(*s*) and transferred to the backup server 13, after which the data will be transferred to the backup data store 14 for backup storage; and
  (iii) a "file close" operation to close the file.

On the other hand, during a restore operation in connection with a file, the control module 41 will initiate a number of operations in connection with the file, including (i) a "file open" operation, as described above;
  (ii) one or more "file write" operations, in which data retrieved from the backup data store 14 is transferred to the mass storage subsystem 12 for storage; and
  (iii) a "file close" operation, as described above.

The control module 41 generates file open, file read, file write and file close commands, which are executed by the file map utilization module 43 using information from the file map 40, to enable the operations as described above to be performed in connection with a file to be backed up or restored. In addition, the control module 41 can generate file seek commands, which are executed by the file map utilization module 43 using information from the file map 40, to identify particular offsets into a file at which retrieval of data is to begin during execution of a subsequent file read command, or at which data is to be stored during execution of a subsequent file write command. The operations performed by the file map utilization module 43 in connection with each of the file open, file seek, file read, file write and file close commands are described in connection with FIG. 3 through 7, respectively.

More specifically, the control module 41 provides in the file open command the file name of the file to be opened and may also include a file map pointer that points to a file map 40 that includes a file map entry 50(*f*) for the file. The control module 41 will provide a file map pointer in the file open command if the file identified by the file name contained in the file open command is not accessible through conventional file system commands that are processed by the file system manager (not shown) of the operating system controlling the backup server 13; on the other hand, the control module 41 will not provide a file map pointer in the file open command if the file the file identified by the file name of the file open command is accessible through conventional file system commands that are processed by the file system manager of the operating system that is controlling the backup server 13. Thus, with reference to FIG. 3, after receiving the file open command (step 120), the file map utilization module 43 will initially determine whether the file open command includes a file map pointer (step 121). If the file map utilization module 43 makes a negative determination in step 121, that is, if it determines that the file open command does not include a file map pointer, it will transfer the file open command to the backup server's file system manager for processing in a conventional manner (step 122)

Returning to step 121, if the file map utilization module 43 makes a positive determination in that step, that is, if it determines that the file open command does include a file map pointer, it will retrieve the file map entry 50(*f*) that is associated with the file identified by the file name in the file open command, from the map file pointed to by the file map pointer provided in the file open command, for ready access in the backup server's memory (not separately shown) (step 123). The file map entry 50(*f*) that is associated with the file is the file map entry 50(*f*) which contains, in the file name field 51, a file name that corresponds to the file name provided in the file open command. In addition, the file map utilization module 43 establishes and initializes several counters to be used during retrieval of data from the extent (s) identified in the file map entry's file extent list 54 during a backup operation, or during storage of data on the extent(s) identified in the file map entry's file extent list 54 during a restore operation, including a current extent pointer, a current extent offset pointer, and a file offset pointer (step 124). Following step 124, or following step 122 if the file open command was transferred to the backup server's file system manager for processing in a conventional manner, the file map utilization module 43 will provide the control module 41 with a file descriptor that the control module 41 can use in subsequent operations in connection with the file while the file is open (step 125).

Figure 4:
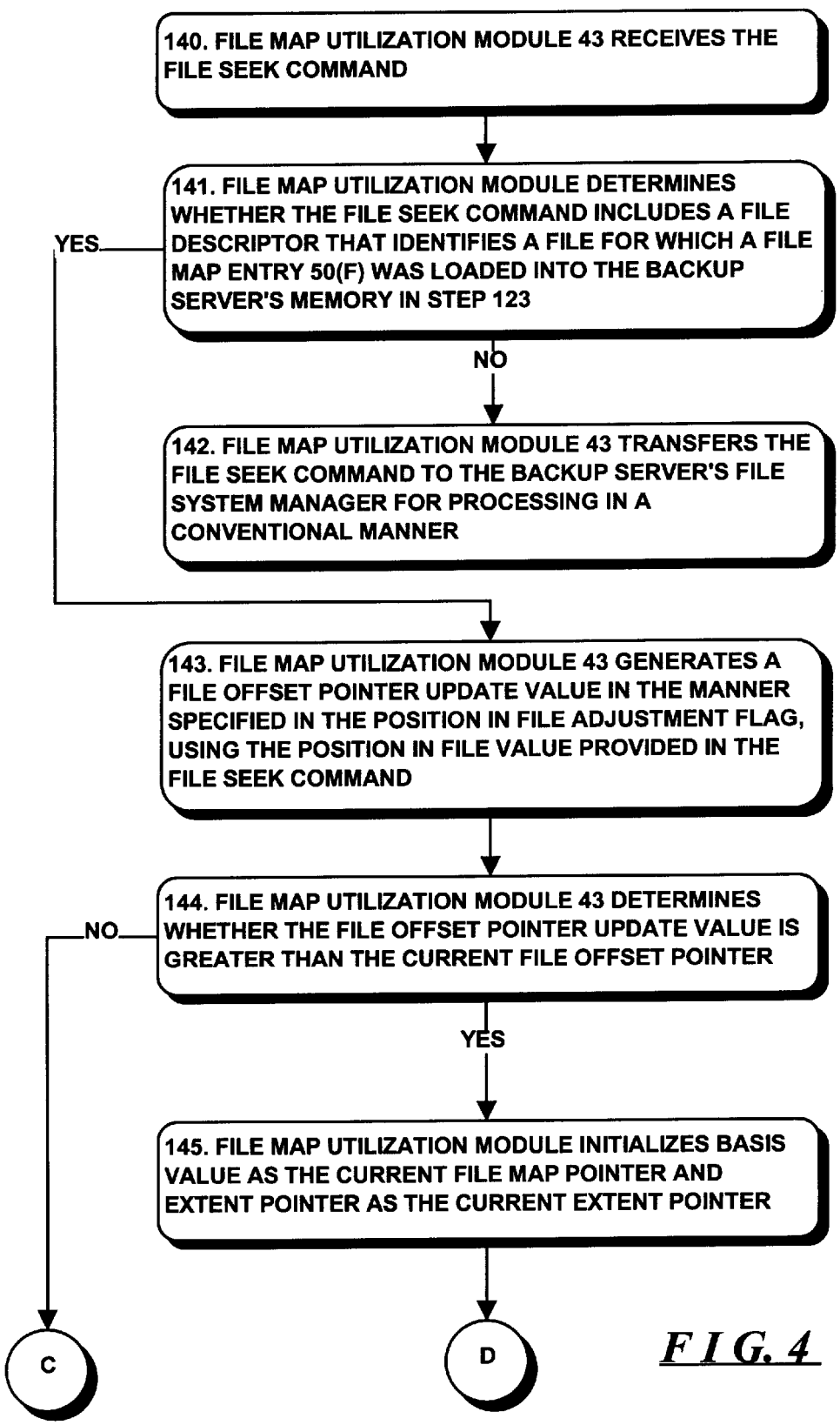
Figure 4A:
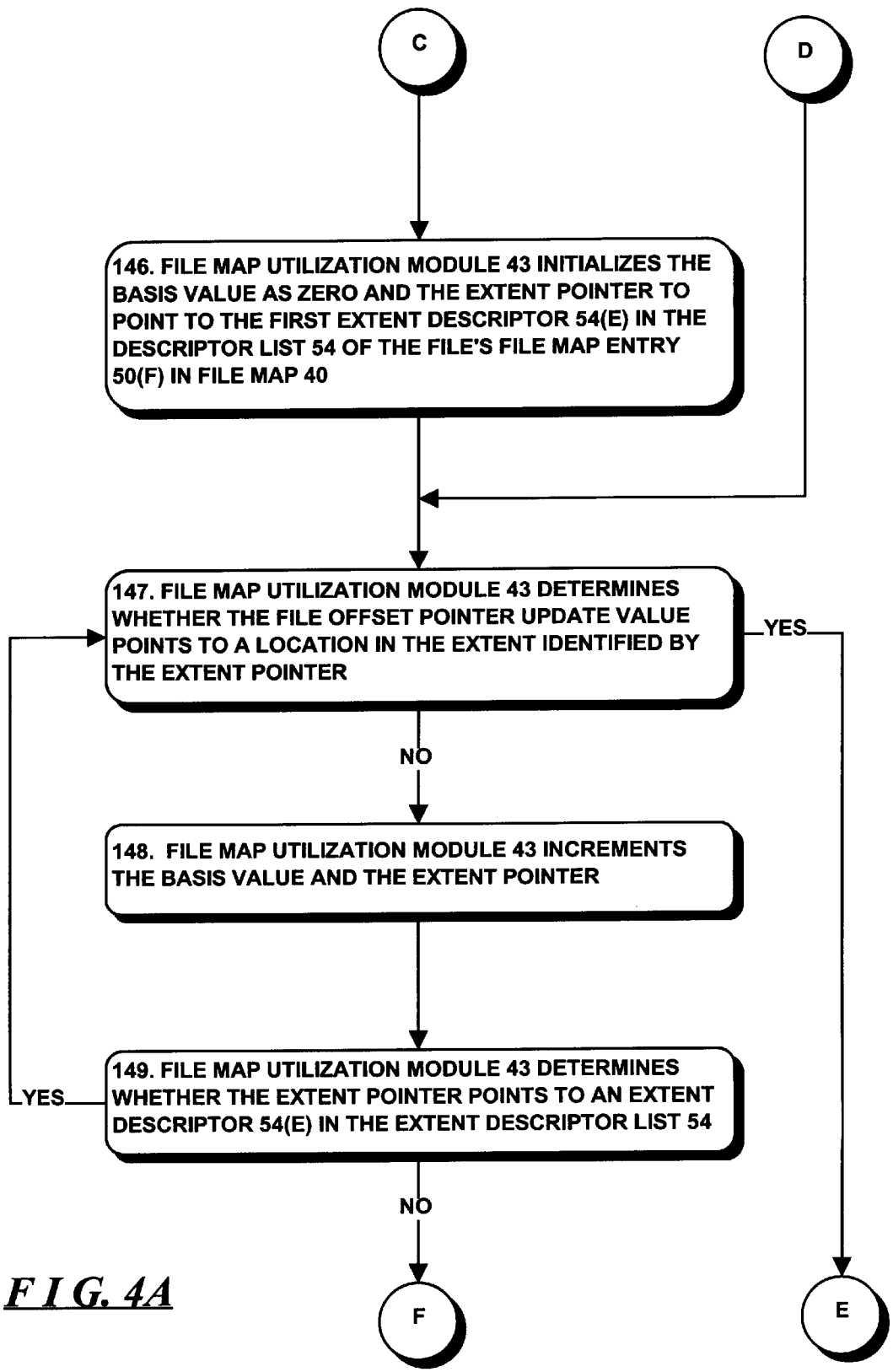
Figure 4B:
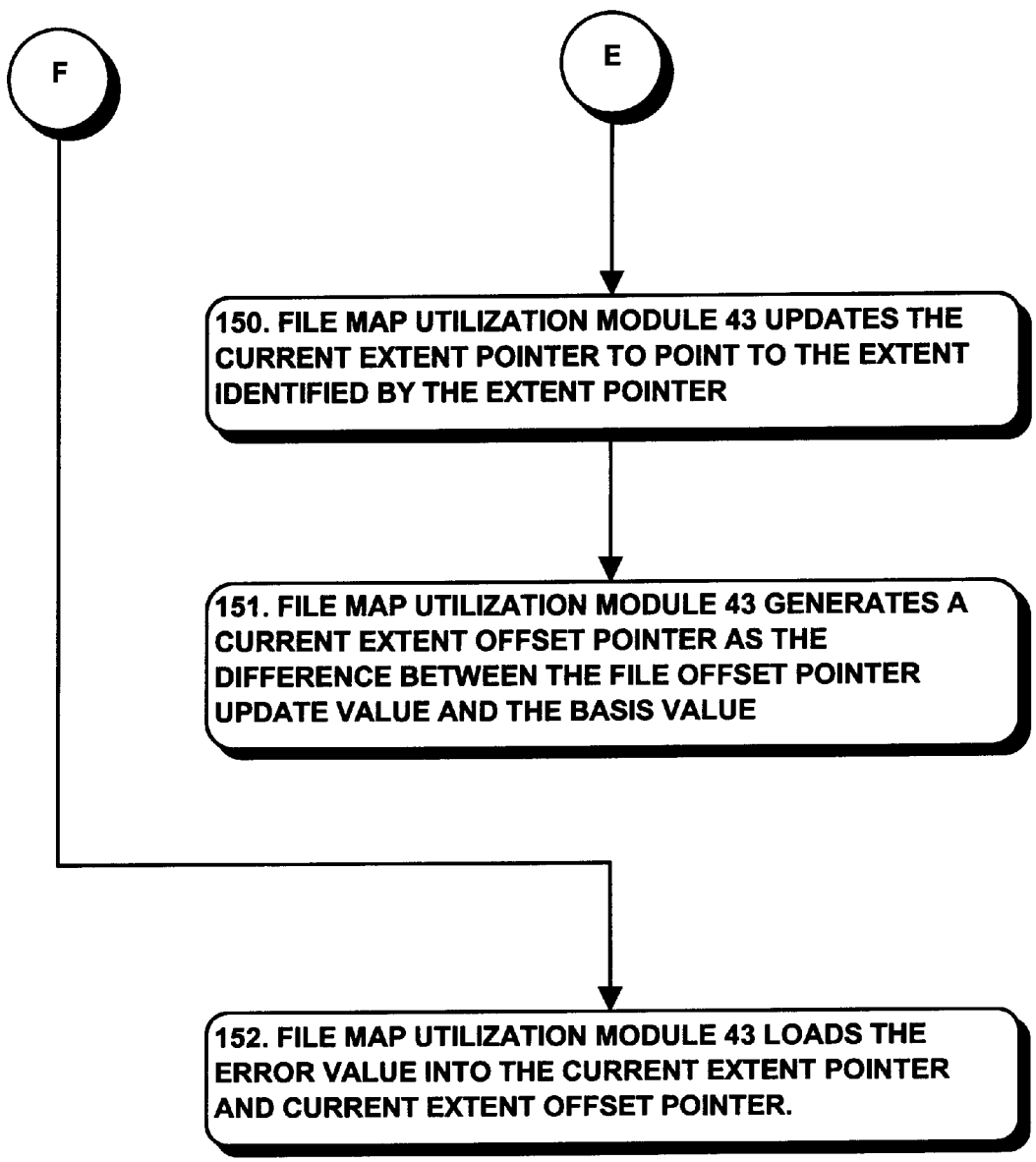

Operations performed by the file map utilization module 43 during execution of a file seek command will be described in connection with FIG. 4. Essentially, a file seek command for a file mapped in the file map 40 enables the file map utilization module 43 to update the current extent pointer, current extent offset pointer and file offset pointer that were established for the file during execution of the file open command to point to a particular location in the file. A file seek command, as provided by the control module 41, includes a file descriptor for the file from which data is to be retrieved, a position in file value and a position in file adjustment flag. The file descriptor provided in the file seek command corresponds to the file descriptor that was provided by the file map utilization module to the control module during execution of the file open command for the file from which data is to be retrieved. The position in file value identifies a position in the file to which the pointers are to be adjusted, and the position in file adjustment flag indicates how the position in file value is to be used. In one embodiment, there are three possible values for the position in file adjustment flag, namely, a set value, a current value and an end value. If the position in file adjustment flag has (a) the set value, the file offset pointer is updated to correspond to the position in file value;

(b) the current value, the file offset pointer is updated to correspond to the current file offset pointer plus the position in file value; and (c) the end value, the file offset pointer is updated to correspond to a value corresponding to the size of the file plus the position in file value. It will be appreciated that the size of the file corresponds to the sum of the number of blocks fields NUM_BLKS of the extent descriptors 54(*e*) in the extent descriptor list 54 in the file map entry 50(*f*) associated with the file in the file map 40.

In any case, (d) the current extent pointer is conditioned to point to the particular extent descriptor 54(*e*) in the extent descriptor list 54 that identifies the disk extent which contains the particular item of data pointed to by the file offset pointer, and (e) the current extent offset pointer is conditioned to point to the offset into the extent identified by the current extent pointer to the particular item of data pointed to by the file offset pointer.

In one embodiment, if the file offset pointer, as updated during execution of the file seek command, points to a file offset that is beyond the end of the file, the updated value of the file offset pointer is maintained, but the file map utilization module 43 provides an error value in the current extent pointer.

Thus, after the file map utilization module 43 receives the file seek command (step 140), it (that is, the file map utilization module) will initially determine whether the file seek command includes a file descriptor that identifies a file for which a file map entry 50(*f*) was loaded into the backup server's memory in step 123 (step 141). If the file map utilization module 43 makes a negative determination in step 141, that is, if it determines that the file seek command does not include such a file descriptor, it will transfer the file seek command to the backup server's file system manager for processing in a conventional manner (step 142).

Returning to step 141, if the file map utilization module 43 makes a positive determination in that step, that is, if it determines that the file seek command does include a file descriptor that identifies a file for which a file map entry 50(*f*) was loaded into the backup server's memory in step 123, it will generate a file offset pointer update value in the manner specified in the position in file adjustment flag, using the position in file value provided in the file seek command (step 143). Thereafter, the file map utilization module 43 will perform a number of steps to update the current extent pointer and the current extent offset pointer. In that operation, the file map utilization module 43 makes use of two variables, namely, a basis variable and an extent pointer, which will be initialized to particular values depending on whether the file offset pointer update value generated in step 143 is greater than the current file offset pointer. If the file offset pointer update value is greater than the current file offset pointer, the file offset pointer update value points to a location in the file that is after the location that is pointed to by the current file offset pointer, and so the file map utilization module 43 can update the current extent pointer and current extent offset pointer from their current values. On the other hand, if the file offset pointer update value is less than the current file offset pointer, the file offset pointer update value points to a location in the file that is before the location that is pointed to by the current file offset pointer, and so the file map utilization module will update the current extent pointer and current extent offset pointer starting from the beginning of the file.

Thus, the file map utilization module 43, after generating the file offset pointer update value in step 143, will determine whether the file offset pointer update value is greater than the current file offset pointer (step 144). If the file map utilization module makes a positive determination in step 144, it will initialize the basis value as the current file map pointer and the extent pointer as the current extent pointer (step 145). On the other hand, if the file map utilization module 43 makes a negative determination in step 144, it will initialize the basis value as zero and the extent pointer to point to the first extent descriptor 54(*e*) in the descriptor list 54 of the file's file map entry 50(*f*) in file map 40 (step 146). After initializing the basis value and extent pointer (steps 145 and 146), the file map utilization module 43 determines whether the file offset pointer update value points to a location in the extent identified by the extent pointer (step 147). In that operation, the file map utilization module 43 can subtract the basis value from the file offset pointer update value and compare the difference to the value of the number of blocks field NUM_BLKS in the extent descriptor 54(*e*) pointed to by the extent pointer. If the file map utilization module 43 determines that the difference is not less than the value in the number of blocks field, the location in the file pointed to by the file offset pointer update value is not in the file extent that is pointed to by the extent pointer, and so if the file map utilization module 43 makes a negative determination in step 147, it will increment the basis value to correspond to the value of the number of blocks field NUM_BLKS, and the extent pointer (step 148). The file map utilization module 43 will then determine whether the extent pointer points to an extent descriptor 54(*e*) in the extent descriptor list 54 (step 149). If the file map utilization module 43 makes a positive determination in step 149, it will return to step 147 to determine whether the file offset pointer update value points to a location in the extent identified by the extent pointer as incremented in step 148.

The file map utilization module 43 will perform steps 147 through 149 through a series of iterations until it determines either, in step 147, that the file offset pointer update value points to a location in the extent identified by the extent pointer, or, in step 149, that the extent pointer does not point to an extent descriptor 54(*e*) in the extent descriptor list 54. If the file map utilization module 43 determines in step 147 that the file offset pointer update value points to a location in the extent identified by the extent pointer, it updates the current extent pointer to point to the extent identified by the extent pointer (step 150), and generates a current extent offset pointer as the difference between the file offset pointer update value and the basis value (step 151). On the other hand, if the file map utilization module determines in step 149 that the extent pointer does not point to an extent descriptor 54(*e*) in the extent descriptor list 54, it will load the aforementioned error value into the current extent pointer and current extent offset pointer (step 152).

Figure 5:
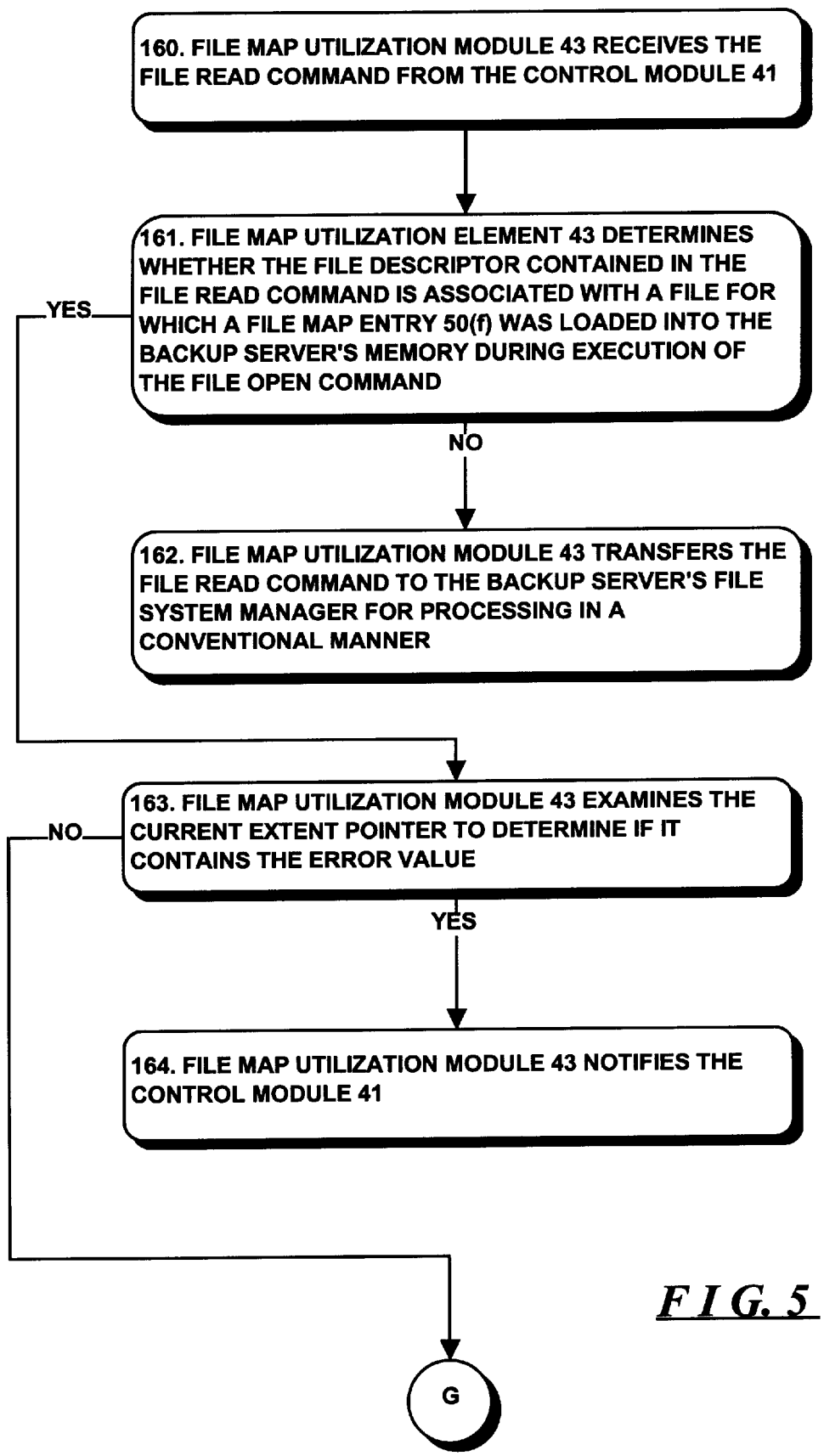
Figure 5B:
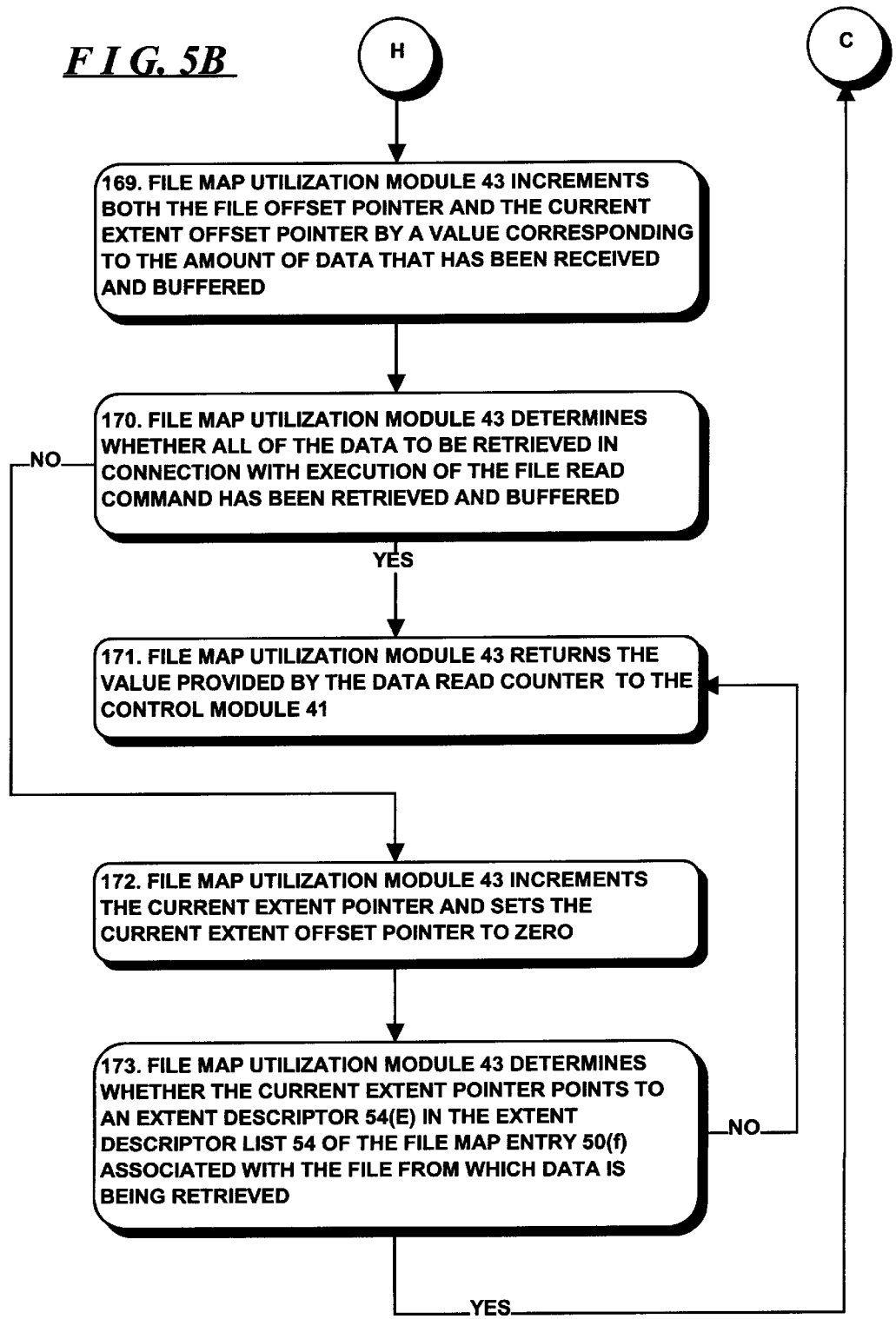

Operations performed by the file map utilization module 43 during execution of a file read command will be described in connection with FIG. 5. A file read command, as provided by the control module 41, includes the file descriptor for the file from which data is to be retrieved, a pointer to a buffer in the backup server's memory, and a count value. The file descriptor provided in the file read command corresponds to the file descriptor that was provided by the file map utilization module 43 to the control module 41 during execution of the file open command for the file from which data is to be read. The buffer to which the buffer pointer points is the buffer in which the retrieved data is to be stored. The count value identifies the amount of data to be retrieved. As described above in connection with the file seek command, the data will be retrieved beginning from the location in the file pointed to by the file offset pointer, which, in turn, corresponds to disk extent pointed to by the current extent pointer, at an offset pointed to by the disk extent offset pointer associated with the file. Thus, with reference to FIG. 5, after receiving the file read command from the control module 41 (step 160), the file map utilization element 43 will initially determine whether the file descriptor contained in the file read command is associated with a file for which a file map entry 50(f) was loaded into the backup server's memory during execution of the file open command (step 161). If the file map utilization module 43 makes a negative determination in step 161, that is, if it determines that the file read command does not include such a file descriptor, it will transfer the file read command to the backup server's file system manager for processing in a conventional manner (step 162).

Returning to step 161, if the file map utilization module 43 makes a positive determination in that step, that is, if it determines that the file read command does include a file descriptor that identifies a file for which a file map entry 50(f) was loaded into the backup server's memory in step 123, it will examine the current extent pointer to determine if it contains the aforementioned error value (step 163). If the file map utilization module 43 makes a positive determination in that step, it will notify the control module 41 (step 164).

Returning to step 163, if the file map utilization module 43 makes a negative determination in that step, it will establish a data read counter and a remaining data counter and initialize them to zero and the count value contained in the file read command, respectively (step 165). Thereafter, the file map utilization module 43 will generate a value identifying the amount of data that will be retrieved from the disk extent pointed to by the extent descriptor 54(f) that is, in turn, pointed to by the current extent pointer (step 166). That value corresponds to the lesser of (i) the difference between the current extent offset pointer and the value in the number of blocks field NUM_BLKS in the extent descriptor 54(f) pointed to by the current extent pointer and (ii) the value provided by the remaining data counter.

After step 166, the file map utilization module 43 enables the mass storage subsystem 12 to retrieve an amount of data corresponding to the value generated in step 166, from the disk extent pointed to by the extent descriptor 54(e) that is, in turn, pointed to by the current extent pointer, beginning at an offset pointed to by the current extent offset pointer (step 167). As the file map utilization module 43 receives the data from the mass storage subsystem 12, it will store the data in the buffer pointed to by the buffer pointer provided in the file read command, for later transfer to the backup data store 14 during a backup operation. After the file map utilization module 43 has received and buffered all of the data, it (that is, the file map utilization module) will increment the data read counter and decrement the remaining data counter by a value corresponding to the amount of data that has been received and buffered (step 168). In addition, the file map utilization module 43 will increment both the file offset pointer and the current extent offset pointer by a value corresponding to the amount of data that has been received and buffered (step 169).

Following step 169, the file map utilization module 43 will determine if all of the data to be retrieved in connection with execution of the file read command has been retrieved and buffered (step 170). In that operation, the file map utilization module 43 will determine whether the remaining data counter has been decremented to zero. If the file map utilization module 43 makes a positive determination in step 170, it will return the value provided by the data read counter to the control module 41 (step 171). On the other hand, if the file map utilization module 43 makes a negative determination in step 170, it will attempt to enable additional data to be retrieved from the mass storage subsystem 12 for buffering. It will be appreciated that, if the file map utilization module 43 needs to enable additional data to be retrieved, the additional data will be retrieved from the next disk extent that is associated with the file, that is, the disk extent identified by the next extent descriptor 54(e) in the extent descriptor list 54, if one exists. In addition, it will be appreciated that the additional data will be retrieved from the beginning of that disk extent. Thus, the file map utilization module 43 will, following a negative determination in step 170, increment the current extent pointer and set the current extent offset pointer to zero (step 172). Thereafter, the file map utilization module 43 determines whether the current extent pointer points to an extent descriptor 54(e) in the extent descriptor list 54 of the file map entry 50(f) associated with the file from which data is being retrieved (step 173). If the file map utilization module 43 makes a positive determination in step 173, it will return to step 166 to initiate a retrieval of data from the extent identified by the extent descriptor 54(e) pointed to by the current extent pointer. On the other hand, if the file map utilization module 43 makes a negative determination in step 173, it will sequence to step 171 to return the value provided by the data read counter to the control module 41.

Figure 6:
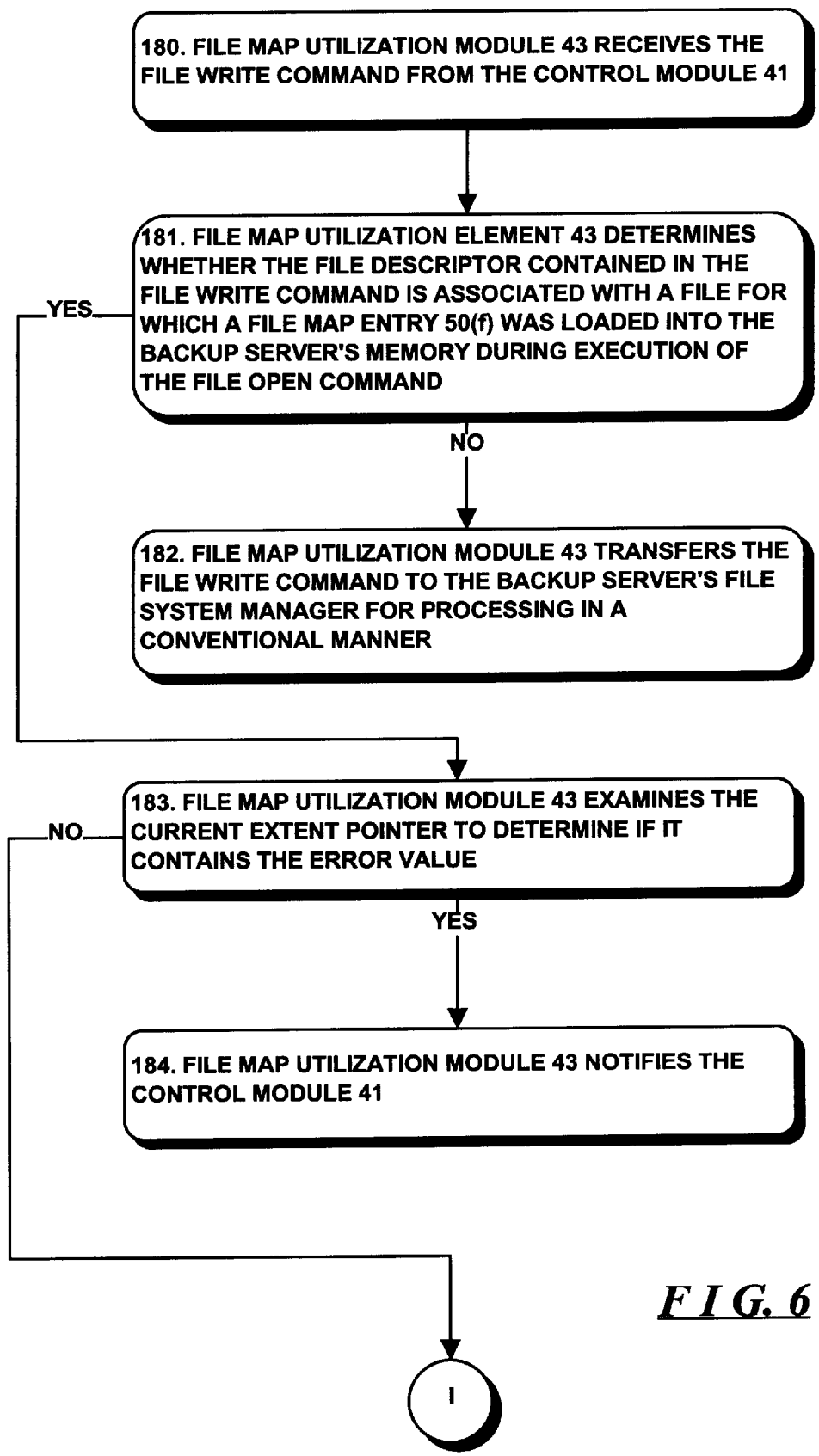
Figure 6A:
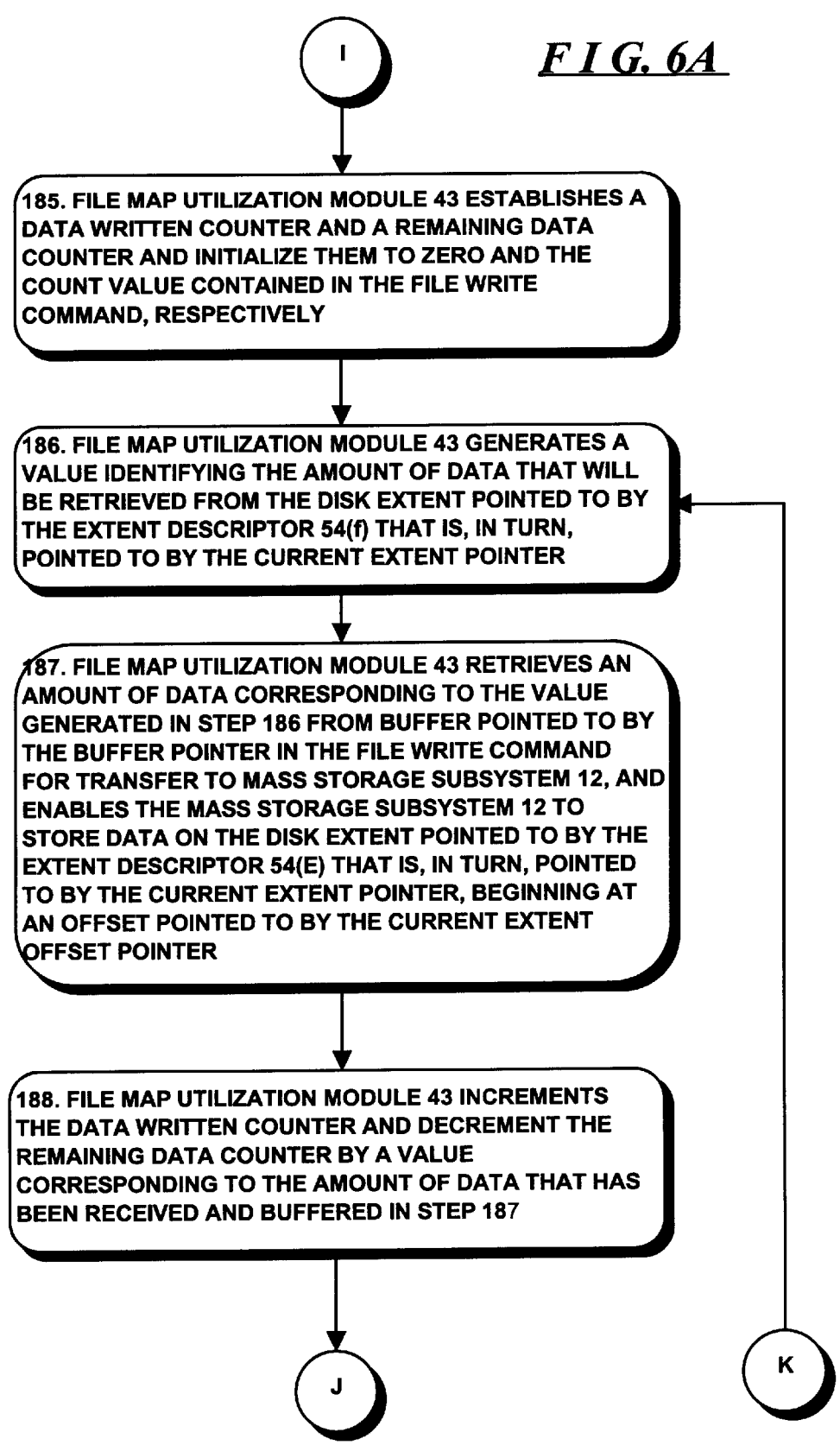
Figure 6B:
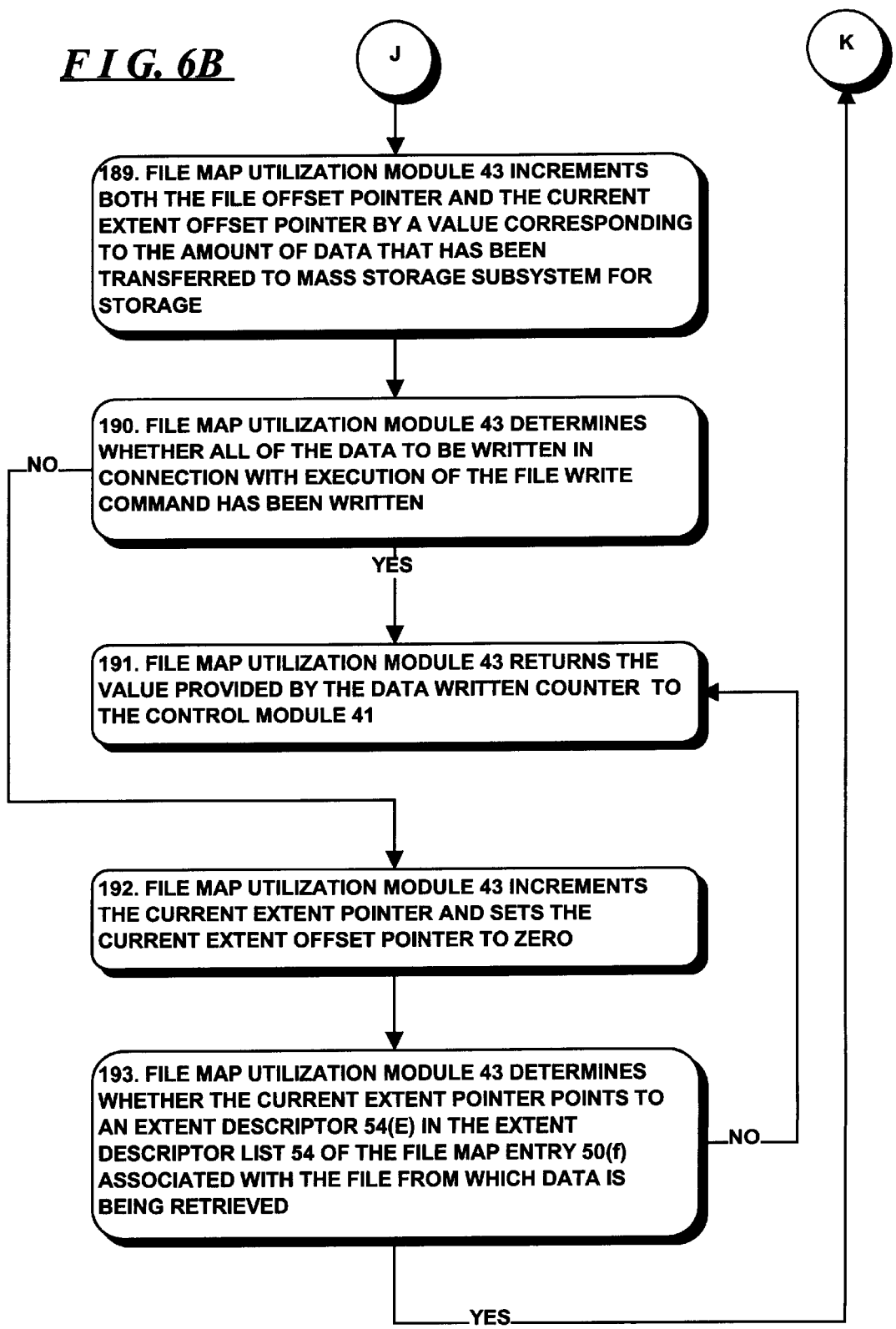

Operations performed by the file map utilization module 43 during execution of a file write command are depicted in FIG. 6. A file write command, as provided by the control module 41, includes the file descriptor for the file from in which data is to be stored, a pointer to a buffer in the backup server's memory, and a count value. The file descriptor provided in the file write command corresponds to the file descriptor that was provided by the file map utilization module 43 to the control module 41 during execution of the file open command for the file from which data is to be read. The buffer to which the buffer pointer points is the buffer from which the data to be written has been stored by the; it will be appreciated that the buffered data will generally have been retrieved from the backup data store 14 as part of a restore operation. The count value identifies the amount of data to be stored. Operations performed by the file map utilization module 43 during execution of the file write command, comprising steps 180 through 193 as depicted in FIG. 6, generally conform to the operations performed during execution of a file read command, comprising corresponding steps 160 through 173 as depicted in FIG. 5, except that in step 187 (corresponding to step 167) the file map utilization module 43 retrieves data from the buffer pointed to by the buffer pointer and transfers the data to the mass storage subsystem 12 for storage.

Figure 7:
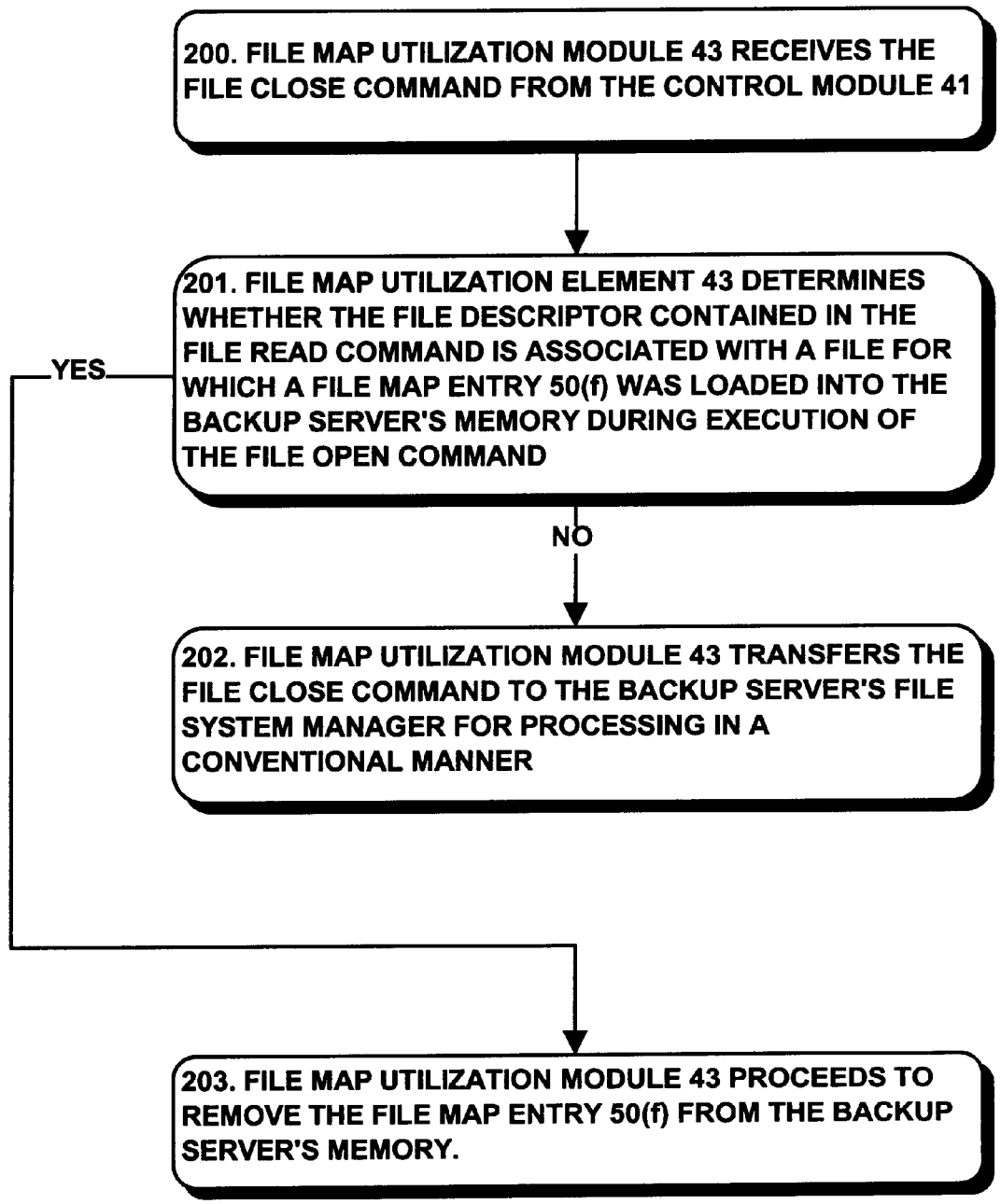

Finally, operations by the file map utilization module 43 performed during execution of a file close command are depicted in FIG. 7. A file close command, as provided by the control module 41, includes the file descriptor for the file from in which data is to be stored. The file descriptor provided in the file write command corresponds to the file descriptor that was provided by the file map utilization module 43 to the control module 41 during execution of the file open command for the file from which data is to be read. Thus, with reference to FIG. 7, after receiving the file close command from the control module 41 (step 200), the file map utilization element 43 will initially determine whether the file descriptor contained in the file close command is associated with a file for which a file map entry 50(*f*) was loaded into the backup servers memory during execution of the file open command (step 201). If the file map utilization module 43 makes a negative determination in step 201, that is, if it determines that the file close command does not include such a file descriptor, it will transfer the file close command to the backup server's file system manager for processing in a conventional manner (step 202). Returning to step 201, if the file map utilization module 43 makes a positive determination in that step, that is, if it determines that the file close command does include a file descriptor that identifies a file for which a file map entry 50(*f*) was loaded into the backup server's memory in step 123, the file map utilization module will proceed to remove the file map entry 50(*f*) from the backup server's memory.

The invention provides a number of advantages. In particular, the invention provides an arrangement for generating operating system-independent information for the files stored on a mass storage subsystem 12 that are to be backed up or restored, for use during a backup or restore operation. Thus, the backup server 13 can access data stored in a file on the mass storage subsystem 12 during a backup operation, or transfer data for storage in locations on the mass storage subsystem 12 on which a file is stored during a restore operation, without having to use the same operating system as the host computer 11 which maintains the file.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A file management system for use in connection with a host and a mass storage subsystem, the mass storage subsystem storing data in at least one file on at least one storage device, said storage device including a series of blocks, the host processing an application program that accesses data in said at least one file through an operating system, the file management system managing files stored on said mass storage subsystem in response to file management commands directed thereto, the system comprising:

A. an operating system-independent file map configured to store information identifying, for each file, block information identifying blocks on which the file is stored, B. a file management command receiver module for receiving a file management command, and C. a file management command execution module for executing the file management command in relation to the operating system-independent file map and independently of said operating system.

2. A system as defined in claim 1 in which each entry identifies, for each file, at least one device extent identifying at least one block on which the file is stored and a length value identifying a number of contiguous blocks including the at least one block.

3. A system as defined in claim 1 in which the operating system-independent file map includes at least one entry, each entry associated with a file, and in which one type of file management command is a mapped file open command, the file management command execution module, in response to a file management command of the mapped file open type, verifying that the operating system-independent file map includes an entry associated with the file.

4. A system as defined in claim 1 in which at least one type of command is a mapped read command, the file management command execution module, in response to a file management command of the mapped read command type identifying from the block information in the operating system-independent file map ones of said blocks on said mass storage subsystem from which data is to be retrieved.

5. A system as defined in claim 1 in which at least one type of command is a mapped write command, the file management command execution module, in response to a file management command of the mapped write command type identifying from the block information in the operating system-independent file map ones of said blocks on said mass storage subsystem on which data is to be stored.

6. A file management method for managing files stored on a mass storage subsystem, the mass storage subsystem further being connected to a host, the mass storage subsystem storing data in at least one file on at least one storage device, said storage device including a series of blocks, the host processing an application program that accesses data in said at least one file through an operating system, the file management system managing files stored on said mass storage subsystem in response to file management commands directed thereto the method comprising the steps of:

A. providing an operating system-independent file map configured to store information identifying, for each file, block information identifying blocks on which the file is stored, B. receiving a file management command, and C. executing the file management command in relation to the operating system-independent file map independently of the operating system.

7. A method as defined in claim 6 in which each entry identifies, for each file, at least one device extent identifying at least one block on which the file is stored and a length value identifying a number of contiguous blocks including the at least one block.

8. A method as defined in claim 6 in which the operating system-independent file map includes at least one entry, each entry associated with a file, and in which one type of file management command is a mapped file open command, the file management command execution step including the step of, in response to a file management command of the mapped file open type, verifying that the operating system-independent file map includes an entry associated with the file.

9. A method as defined in claim 6 in which at least one type of command is a mapped read command, the file management command execution step including the step of, in response to a file management command of the mapped read command type identifying from the block information in the operating system-independent file map ones of said blocks on said mass storage subsystem from which data is to be retrieved.

10. A method as defined in claim 6 in which at least one type of command is a mapped write command, the file management command execution step including the step of, in response to a file management command of the mapped write command type identifying from the block information in the operating system-independent file map ones of said blocks on said mass storage subsystem on which data is to be stored.

11. A computer program product for use in connection with a computer to form a file management system, the file management system being for use in connection with a host and a mass storage subsystem, the mass storage subsystem storing data in at least one file on at least one storage device, said storage device including a series of blocks, the host processing an application program that accesses data in said at least one file through an operating system, the file management system managing files stored on said mass storage subsystem in response to file management commands directed thereto, the computer program product including a computer-readable medium having encoded thereon:

A. an operating system-independent file map module configured to enable the computer to store information identifying, for each file, block information identifying blocks on which the file is stored, B. a file management command receiver module configured to enable the computer to receive a file management command, and C. a file management command execution module configured to enable the computer to execute the file management command in relation to the operating system-independent file map and independently of the operating system.

12. A computer program product as defined in claim 10 in which each entry identifies, for each file, at least one device extent identifying at least one block on which the file is stored and a length value identifying a number of contiguous blocks including the at least one block.

13. A computer program product as defined in claim 10 in which the operating system-independent file map includes at least one entry, each entry associated with a file, and in which one type of file management command is a mapped file open command, the file management command execution module enabling the computer to, in response to a file management command of the mapped file open type, verify that the operating system-independent file map includes an entry associated with the file.

14. A computer program product as defined in claim 10 in which at least one type of command is a mapped read command, the file management command execution module enabling the computer to, in response to a file management command of the mapped read command type identifying from the block information in the operating system-independent file map ones of said blocks on said mass storage subsystem from which data is to be retrieved.

15. A computer program product as defined in claim 10 in which at least one type of command is a mapped write command, the file management command execution module enabling the computer to, in response to a file management command of the mapped write command type identifying from the block information in the operating system-independent file map ones of said blocks on said mass storage subsystem on which data is to be stored.

16. A digital data processing system comprising:

A. a mass storage subsystem configured to store data in at least one file on at least one storage device, said storage device including a series of blocks;

B. a host configured to process an application program that accesses data in said at least one file through an operating system; and C. a file management subsystem configured to manage files stored on said mass storage subsystem in response to file management commands directed thereto, the file management subsystem comprising:

i. an operating system-independent file map configured to store information identifying, for each file, block information identifying blocks on which the file is stored, ii. a file management command receiver module for receiving a file management command, and iii. a file management command execution module for executing the file management command in relation to the operating system-independent file map and independently of said operating system.

17. A system as defined in claim 16 in which each entry identifies, for each file, at least one device extent identifying at least one block on which the file is stored and a length value identifying a number of contiguous blocks including the at least one block.

18. A system as defined in claim 16 in which the operating system-independent file map includes at least one entry, each entry associated with a file, and in which one type of file management command is a mapped file open command, the file management command execution module, in response to a file management command of the mapped file open type, verifying that the operating system-independent file map includes an entry associated with the file.

19. A system as defined in claim 16 in which at least one type of command is a mapped read command, the file management command execution module, in response to a file management command of the mapped read command type identifying from the block information in the operating system-independent file map ones of said blocks on said mass storage subsystem from which data is to be retrieved.

20. A system as defined in claim 16 in which at least one type of command is a mapped write command, the file management command execution module, in response to a file management command of the mapped write command type identifying from the block information in the operating system-independent file map ones of said blocks on said mass storage subsystem on which data is to be stored.

* * * * *